Patented Aug. 22, 1939

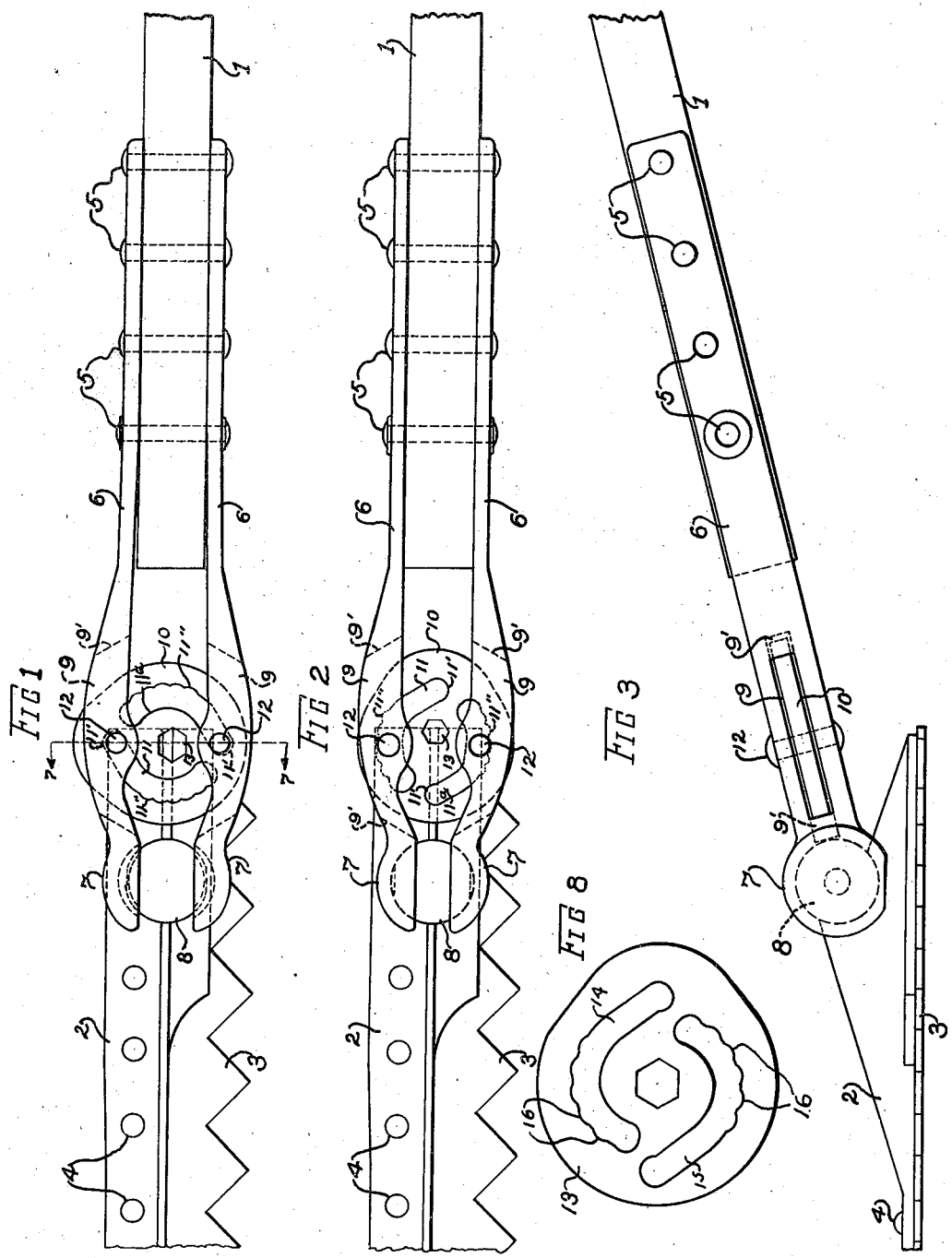

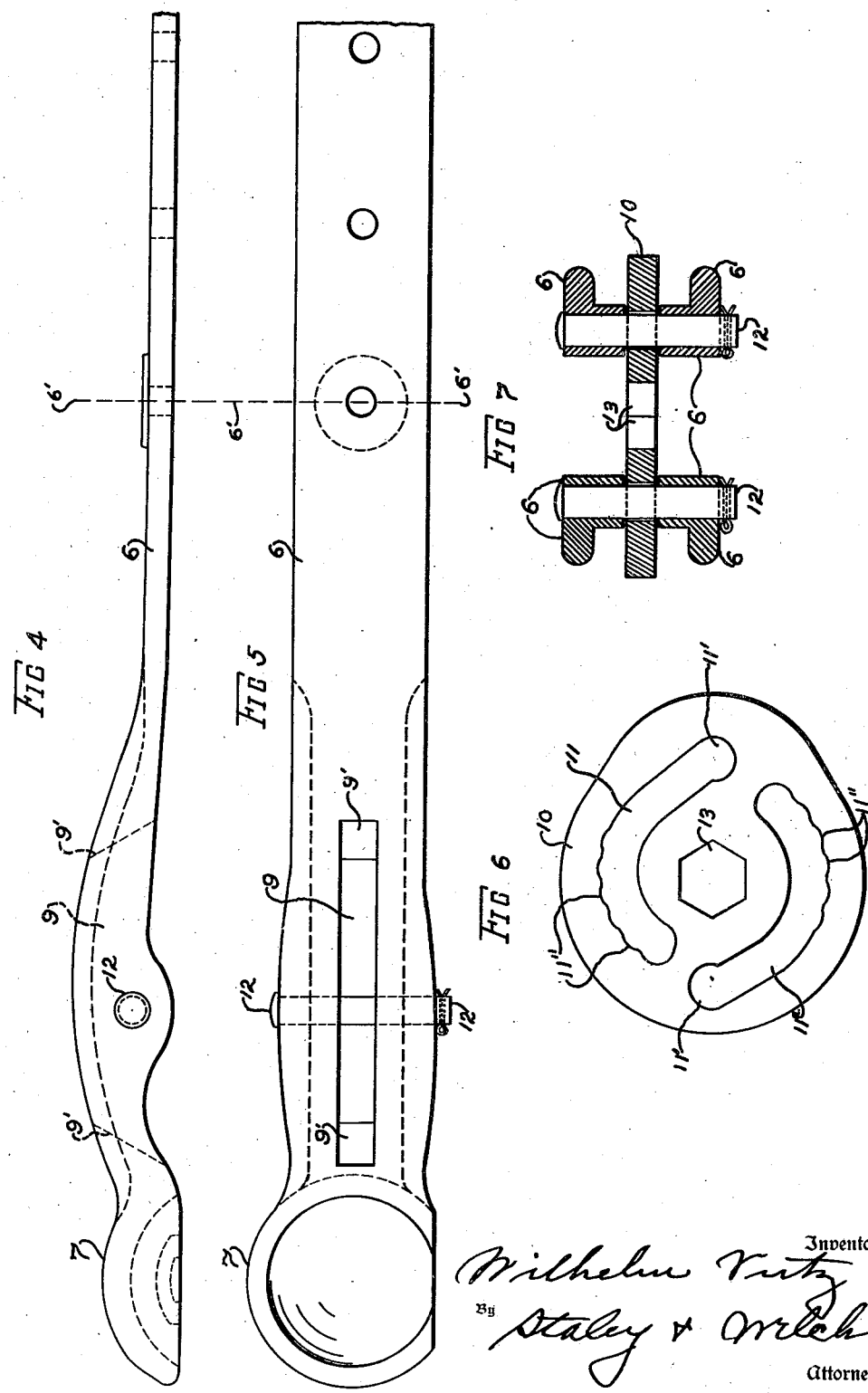

2,170,041

UNITED STATES PATENT OFFICE 2,170,041

PITMAN ROD CONNECTION

Wilhelm Vutz, Coldwater, Ohio, assignor to New Idea, Inc., Coldwater, Ohio, a corporation of Ohio Application March 28, 1938, Serial No. 198,411

6 Claims. (Cl. 287—89)

This invention relates to a connection for connecting two members together, it more particularly relating to a connection for securing a pitman rod to a member such as the reciprocating knife used in grass mowers and the like, although not necessarily limited to that particular purpose.

One of the objects of the invention is to provide a connection between a pitman rod and another member, such as a knife head of a mower, which will securely fasten the parts in operative position but will permit the rod and other member to be quickly and readily separated when desired.

A further and more specific object of the invention is to provide an internal floating cam device which will operate upon the parts to fasten them together in operative position and which may be readily turned to release the parts when it is desired to separate the pitman rod from the other member, such as the knife head of a mower.

In the accompanying drawings:

Fig. 1 is a plan view of portions of a pitman rod and knife head showing the improved devices for securing them together, the parts being in the position assumed before the rod has been locked to the head.

Fig. 2 is plan view of the parts shown in Fig. 1 but in the position when the rod and knife head have been locked together.

Fig. 3 is a side elevation of the parts illustrated in Fig. 2.

Fig. 4 is a plan view of one of the pitman rod straps.

Fig. 5 is a side elevation of the strap shown in Fig. 4.

Fig. 6 is a plan view of the cam.

Fig. 7 is a section on the line 7—7 of Fig. 1.

Fig. 8 is a plan view of a modified form of cam.

In the drawings my invention has been shown as applied for connecting a pitman rod to the knife head of a mower or similar implement and will be so described, although I do not wish to limit myself to the application of the invention to that particular form of connection, as it may be employed for connecting other members not necessarily in the form of a pitman rod or a knife head.

Referring to the drawings, 1 represents a portion of a pitman rod, 2 a portion of the knife head and 3 a portion of the knife which is secured to the head in any suitable way such as by the rivets 4. The pitman rod has connected therewith by rivets 5 a pair of straps 6, which straps extend beyond the rod and have at their extreme ends concavo-convex members 7 which form in effect a divided socket adapted to embrace a ball 8 formed on the head 2.

Each of the straps between the end of the pitman rod 1 and its socket member 7 is formed with an enlargement 9, each of these enlargements having a tapered slot 9', these slots forming a chamber in which is located a horizontally-disposed cam member 10. This cam member is formed with a pair of slots 11 and 11ª one at least of which is a cam slot and each chambered enlargement is provided with a pin 12 which extends vertically therethrough and through one of the slots 11 or 11ª. In Fig. 6 the slot 11 is shown as the cam slot having varying radii. The slot 11ª however is shown for the major portion of its length with a uniform radius and does not have a camming action. Inasmuch, however, as the cam is a freely floating one, when it is turned the action will be to either force the straps to clamping position or to spread the straps. The cam is provided with a centrally positioned aperture 13 formed with a plurality of straight internal surfaces to receive a suitable tool by which the cam may be turned.

When the pins 12 reside in the rounded ends 11' of the slots, the straps 6, which have some natural spring about the points indicated by the dotted lines 6' in Figs. 4 and 5, are in the position shown in Fig. 1 to permit assembly or disassembly of the parts. When the cam is turned to cause a pin 12 to ride on the outer wall of the cam slot 11 the socket members are forced against the ball 8 so as to place the parts in operative driving relation as shown in Fig. 2.

Each of the outer walls of the slots upon which the pins ride is provided with a series of serrations 11" to receive the corresponding pin 12 so that the pins will prevent the cam from turning due to vibration or wear when the parts are in operative driving relation.

The width of each slot, particularly at the point where the serrations are located, is slightly greater than the diameter of the corresponding pin to permit the pin to recede from the serrations in which it is located when the cam is turned in the opposite direction to spread the straps. When the cam is turned in the opposite direction each pin will ride upon the opposite wall of its corresponding slot for that purpose.

In Fig. 8 there is shown a modification of the cam, indicated at 13, in which each slot, indicated at 14 and 15, is a cam slot; that is, each slot has a varying radius. As in the cam described and shown in Fig. 8, the outer wall of each cam slot is provided with a series of serrations 16 to receive the corresponding pin to hold the cam from turning against vibration or wear. In Fig. 6 these serrations are shown at 11".

Having thus described my invention, I claim:

1. In a connection of the character described, two members, a pair of straps connected with one member, a ball formed on the other member, a socket member on each of said straps to engage said ball, a rotatable internal cam member, and a pin carried by each of said straps, said cam member having a pair of slots one at least of which is a cam slot, each adapted to receive one of said pins whereby when said cam member is rotated said socket members will be moved to or from said ball.

2. In a connection of the character described, two members, a pair of straps connected with one of said members, a ball formed on the other of said members, a socket member on each of said straps to engage said ball, each of said straps having a transverse groove, said grooves being arranged in alignment with each other, a rotatable cam located in said grooves having a pair of slots, one at least of which is a cam slot, and means carried by each of said straps extending through said slots to be engaged with the walls thereof when said cam is turned to move said socket members to or from said ball.

3. In a connection of the character described, two members, a pair of straps connected with one of said members, a ball formed on the other of said members, a socket member on each of said straps to engage said ball, a floating rotatable internal cam member, and a pin carried by each of said straps, said cam member having a pair of slots, one at least of which is a cam slot, each adapted to receive one of said pins whereby when said cam member is rotated said socket members will be moved to or from said ball, the wall of the cam slot upon which the corresponding pin rides when said socket members are moved to clamping position being provided with a series of serrations.

4. In a connection of the character described, two members, a pair of straps connected with one of said members, a ball formed on the other of said members, a socket member on each of said straps to engage said ball, a rotatable internal cam member, and a pin carried by each of said straps, said cam member having a pair of cam grooves, each adapted to receive one of said pins whereby when said cam member is rotated said socket members will be moved to or from said ball.

5. In a connection of the character described, two members, a pair of straps connected with one of said members, a ball formed on the other of said members, a socket member on each of said straps to engage said ball, a rotatable internal cam member having a pair of slots, one of said slots extending on varying radii and the other slot having a uniform radius for the major portion of its length, and a pin carried by each of said straps, said pins extending respectively through said slots whereby when said cam member is rotated said socket members will be moved to or from said ball.

6. In a connection of the character described, a pitman rod, a pair of straps connected with said rod, a knife head having a ball, a socket member on each of said straps to engage said ball, each of said straps having a transverse groove, said grooves being arranged in alignment with each other, a rotatable cam located in said grooves having a pair of slots, one at least of which is a cam slot, and means carried by each of said straps extending through said slots to be engaged with the walls thereof when said cam is turned to move said socket members to or from said ball.

WILHELM VUTZ.